United States Patent
Dawson et al.

(10) Patent No.: US 8,339,514 B2
(45) Date of Patent: Dec. 25, 2012

(54) MODULAR FLEXIBLE SOFTWARE ARCHITECTURE FOR TV

(75) Inventors: Thomas P. Dawson, Escondido, CA (US); Aixin Liu, San Diego, CA (US); Kai Liu, Vista, CA (US); Andy Nguyen, San Diego, CA (US); Ling Jun Wong, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1036 days.

(21) Appl. No.: 12/274,702

(22) Filed: Nov. 20, 2008

(65) Prior Publication Data

US 2010/0057968 A1    Mar. 4, 2010

Related U.S. Application Data

(60) Provisional application No. 61/190,989, filed on Sep. 3, 2008.

(51) Int. Cl.
*H04N 5/44* (2006.01)

(52) U.S. Cl. ..................... 348/553; 725/152

(58) Field of Classification Search ........... 348/553; 710/300–302; 725/132, 140, 152; 712/36
See application file for complete search history.

(56) References Cited

U.S. PATENT DOCUMENTS

| | | | |
|---|---|---|---|
| 5,537,292 A | 7/1996 | Bwoen | |
| 5,787,259 A * | 7/1998 | Haroun et al. | 709/253 |
| 6,052,750 A * | 4/2000 | Lea | 710/72 |
| 6,138,271 A * | 10/2000 | Keeley | 717/140 |
| 6,151,077 A * | 11/2000 | Vogel et al. | 348/553 |
| 6,175,390 B1 * | 1/2001 | Kim et al. | 348/725 |
| 6,272,575 B1 * | 8/2001 | Rajchel | 710/301 |
| 6,363,434 B1 * | 3/2002 | Eytchison | 719/313 |
| 6,469,742 B1 * | 10/2002 | Trovato et al. | 348/553 |
| 6,654,931 B1 * | 11/2003 | Haskell et al. | 715/202 |
| 6,847,411 B2 * | 1/2005 | Pan et al. | 348/839 |
| 7,295,752 B1 * | 11/2007 | Jain et al. | 386/285 |
| 7,395,031 B1 * | 7/2008 | Ritter | 455/77 |
| 7,425,992 B2 | 9/2008 | Feeler et al. | |
| 7,451,460 B2 * | 11/2008 | Birnbaum et al. | 719/328 |
| 7,523,145 B2 * | 4/2009 | Willard et al. | 725/134 |
| 7,814,516 B2 * | 10/2010 | Stecyk et al. | 725/80 |
| 7,859,601 B2 * | 12/2010 | Kondo | 348/789 |
| 8,144,266 B2 * | 3/2012 | Dawson | 348/836 |
| 2002/0120945 A1 * | 8/2002 | Schwalb | 725/140 |
| 2003/0156227 A1 * | 8/2003 | Kondo | 348/714 |
| 2003/0233667 A1 * | 12/2003 | Umipig et al. | 725/152 |
| 2004/0261117 A1 | 12/2004 | Kuh | |
| 2005/0062888 A1 * | 3/2005 | Wood et al. | 348/553 |

(Continued)

OTHER PUBLICATIONS

VICOMTech, Ingema; "Enhanced TV for the Promotion of Active Ageing", http://www.i2home.org/Portals/Documents/aaate2007_EnhancedTVforthePromotionofActiveAging.pdf.

(Continued)

*Primary Examiner* — Jefferey Harold
*Assistant Examiner* — Humam Satti
(74) *Attorney, Agent, or Firm* — John L. Rogitz

(57) ABSTRACT

Rather than have a unique code set per TV product, a common code base is provided to service multiple products and even multiple product lines. Embedded systems can be upgraded through a network connection. The software architecture provides a flexible approach to supporting multiple product offerings through a plug-in modular middle-ware and to providing standardized hardware acceleration for both 2D and 3D graphics. The plug-in capability provides for feature additions and upgrades after sale.

17 Claims, 2 Drawing Sheets

U.S. PATENT DOCUMENTS

| | | | | |
|---|---|---|---|---|
| 2005/0243208 A1* | 11/2005 | Huang | | 348/553 |
| 2006/0085835 A1* | 4/2006 | Istvan et al. | | 725/119 |
| 2006/0239645 A1* | 10/2006 | Curtner et al. | | 386/95 |
| 2007/0091206 A1* | 4/2007 | Bloebaum | | 348/460 |
| 2007/0107019 A1* | 5/2007 | Romano et al. | | 725/80 |
| 2007/0142022 A1* | 6/2007 | Madonna et al. | | 455/352 |
| 2007/0143796 A1* | 6/2007 | Malik | | 725/51 |
| 2007/0234434 A1 | 10/2007 | Bacon et al. | | |
| 2010/0033629 A1* | 2/2010 | Utz et al. | | 348/553 |

OTHER PUBLICATIONS

Digital Television Group: "A Milestone in the History of the DVB Project", http://www.ebu.ch/en/technical/trev/trev_278-marshall.pdf, 1998.

Richard W. Selby, "Event-Driven Software Architectures for Large-Scales Systems", American Institute of Aeronautics and Astronautics, Space 2005, Aug. 30-Sep. 1, 2005, AIAA 2005-6657.

Dan Decasper, Zubin Dittia, Guru Parulkar, Bernhard Plattner; "Router Plugins A Software Architecture for Next Generation Routers", ACM SIGCOMM Computer Communication Review, vol, 28, Issue 4 (Oct. 1998), pp. 229-240.

Jordi Artigas, Detlef Reintsema, Carsten Preusche, Gerd Hirzinger; "DIMSART: A Real time-Device Independent Modular Software Architecture for Robotic and Telerobotic Applications", ICINO (2), 2004, pp. 102-109.

* cited by examiner

MODULAR FLEXIBLE SOFTWARE ARCHITECTURE FOR TV

Priority is claimed from U.S. provisional application 61/190,989, filed Sep. 3, 2008.

FIELD OF THE INVENTION

The present invention relates generally to modular flexible software architectures for TVs.

BACKGROUND OF THE INVENTION

Existing TV architectures are based on a model of fixed functionality that does not change over the lifetime of the product. The set of features and applications are fixed at the time of product definition and do not change. This type of architecture was not originally designed to accommodate updating individual product features after the product has been delivered to the customer.

SUMMARY OF THE INVENTION

As understood herein, a flexible means to upgrade the TV after delivery is desirable. Furthermore as understood herein the need for flexibility extends beyond upgrading after delivery to the customer, and more particularly a more modular and flexible means to develop and then configure product offerings as they are introduced would be advantageous.

Accordingly, a TV system architecture embodied on a tangible computer readable storage medium includes an application logic coordination unit (ALCU), and plural plug in modules (PIM) communicating with the ALCU. Each PIM represents a desired TV system feature. PIM-to-PIM interactions are defined at the PIM level to be product-specific for supporting product differentiation. That is, a particular combination of PIMs may be tailored differently in different models to provide further product differentiation. Additionally, upon adding a new PIM, the new PIM may be programmed to check for other specific PIMs and tailor its behavior accordingly based on the other PIMs and, e.g., the TV model ID, which may be read by the new PIM.

In another aspect, a method includes providing in first and second TV system model lines an application logic coordination unit (ALCU) common to both model lines. The method also includes providing plural plug in modules (PIM) configured for communicating with the ALCU, with each PIM representing a desired TV system feature and with the ALCU routing information between the PIMs. A set of PIMs in the first model line may be different from a set of PIMs in the second model line. The set of PIMs may be established to establish desired features intended for the particular TV model. Combinations of PIMs may include modified PIM versions to add further product differentiation.

In another aspect, a display system includes a video display and processor circuitry implementing a TV feature architecture embodied in software. The architecture includes an application logic coordination unit (ALCU) and plural plug in modules (PIM) communicating with the ALCU. Each PIM represents a desired TV system feature. The ALCU routes information between the PIMs, and new PIMs may be added to the ALCU to cooperate with PIMs communicating with the ALCU.

In some example embodiments a PIM providing a first feature embodies a first application launch judgement in a first model line and a PIM providing the first feature embodies a second application launch judgement in a second model line. The second application launch judgement is different than the first application launch judgement. In some implementations a PIM providing a first feature registers for a first event in a first model line and a PIM providing the first feature registers for a second event in a second model line. The second event is different than the first event. PIM-to-PIM interactions may be defined at the PIM level to be product-specific.

In non-limiting examples, each PIM includes an interface code unique to a particular model line and a feature code common across all model lines in which the PIM is sought to be used. The interface code translates calls from other PIMs received through the ALCU into calls understood by the feature code. The ALCU may include a public interface, a utilities interface, and a PIM interface.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
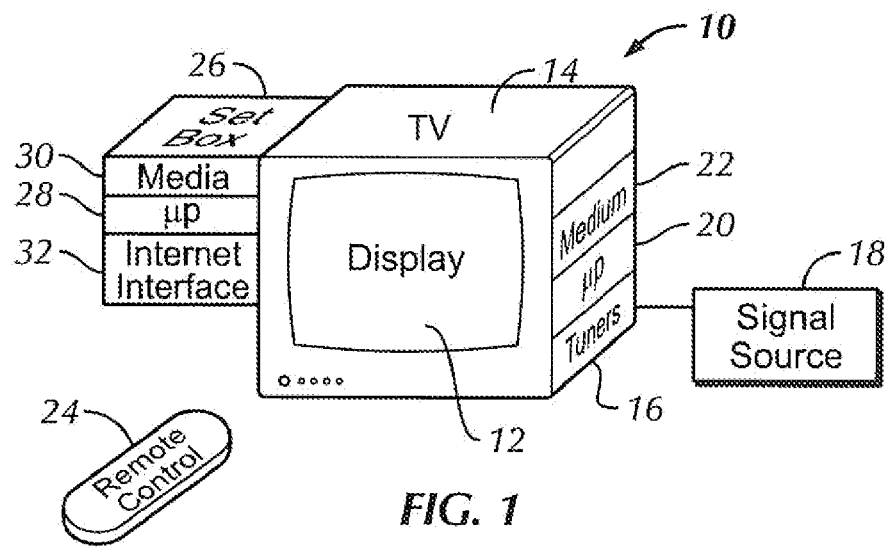
FIG. 1 is a schematic diagram of an example environment in which present principles can be used.

Referring initially to FIG. 1, a system 10 is shown that includes a visual display 12. In the example embodiment shown the visual display 12 is a TV video display such as but not limited to a flat panel matrix-type display.

The system 10 includes a TV chassis 14 holding the display 12 and a TV tuner 16 receiving signals from a source 18 of TV programming such as a cable head end, set-top box, satellite receiver, terrestrial antenna, etc. The tuner 16 typically is mounted in the chassis 14 although in some embodiments the tuner 16 may be part of the set box described farther below.

The chassis 14 also typically holds a TV processor 20 that can access information, including a software implementation of present logic, on a tangible computer-readable storage medium 22 such as one or more disk storages, solid state storages, etc. User commands may be received from a remote control 24.

It is to be understood that while disclosure below focuses on software-implemented PIMs that may be stored on the medium 22 inside the TV chassis 14, in some embodiments a PIM may connect to a software driver for communicating to an external device such as a set box. In nay case, PIMs may be transmitted for storage to the medium 22 through a network connection to the TV or a universal serial bus (USB) thumb drive or other method. In still other implementations, if a PIM is implemented by an external plug-in card, the card, to justify its added cost, may contain specialized hardware for performing computationally intensive tasks to off-load those tasks from the TV processor 20. For example, complex associative searches for recognizing and identifying a persons face within the current video being presented may be off-loaded to a plug-in card in the event that the card is to be used to provide a PIM or PIMs. The PIM for such a feature might, for example, execute PIM to PIM communication to obtain a video capture of the screen image and send it to the external processor on the card. The return data request might then be sent to the below-described ALCU to route the results to a display PIM to report the results. Thus, in FIG. 2 described below, an item such as "Feature C" might be an interface to an external processor or other external device such as a USB thumb drive controller.

As shown in FIG. 1, the system 10 may also include a set box 26 such as a set top box or set back box that can be mechanically fastened to the TV chassis and electrically connected to the internal components thereof. Among other components, the set box 26 may include a box processor 28 accessing one or more computer readable storage media 30 to implement the present architecture. It is to be understood that present principles may be implemented by the TV processor 20 acting in concert with the box processor 28, or that the set box 26 may be omitted in which case present principles are implemented by the TV processor 20.

The system 10 may also preferably include a wide area computer network interface 32, in this case, contained in the set box 26 and controlled by the box processor 28, for accessing a wide area network such as the Internet to receive the below-described modules therefrom. Without limitation the interface 32 may be embodied by a wired or wireless modem.

Present principles include building a foundation for supporting a range of upgradeable products from a single code base. The example non-limiting architecture described further below expands the concept of "plug-in applications" to provide "plug-in middle-ware". This means that more than just a user interface (UI) can be added as a downloadable "plug-in". New capabilities and features can be added to the system in a standardized and consistent manner. The example non-limiting architecture described further below provides a mechanism for various features to be added or removed across a product line from within a single source code base both during development and after product delivery as downloadable "plug-in" modules. The example non-limiting architecture described further below also allows for more efficient product development and faster time to market.

The example non-limiting architecture described farther below provides a standardized yet expandable event delivery while minimizing the overall number of events, grouped module sets that define product offerings, the ability to "freeze" changes on one product set while allowing development to continue on others and a standard mechanism to allow middle-ware components to connect into the overall system.

Thus, each TV product is not simply a selected set of generic software modules. Common code that can remain the same across products is separated from the code that needs to be unique to each product.

Each unique module is called a PIM (Plug In Module). Each PIM represents a respective TV system feature, so that features can plug into the architecture through PIMs that employ a common interface to the Application Logic Coordination Unit (ALCU). The ALCU routes calls and events between PIMs. The PIM interface includes a common set of application programming interfaces (API) entries for all PIMs that allow them to initialize, load, react to system events and initiate events and actions.

Each PIM acts a proxy between the module it represents, such as input from the remote commander, to the generalized system interface used by the ALCU. Each PIM also acts as the repository of the product unique code. Each software module connecting through the PIM to the ALCU is kept "product neutral" with product specific elements kept within the PIM. This allows the features to be shared among products while allowing for feature differentiation within each product.

Accordingly, while the overall system behavior is defined in the central logical control unit, the individual behaviors for each module can be added on a plug-in basis as well. Each individual system module is transparent to each other and can be changed or replaced without affecting any other module. The modified or replaced module only needs to define its system behavior in its PIM, which couples: this module into the whole system through the ALCU.

Figure 2:
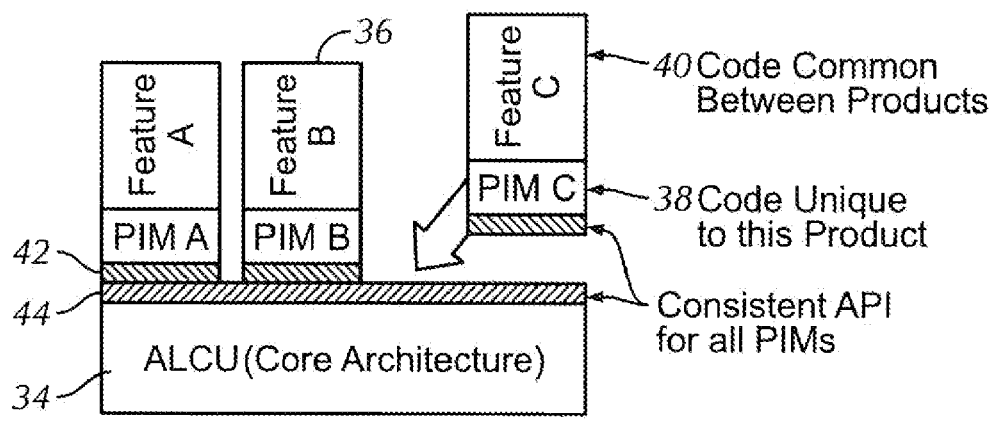
FIG. 2 is a schematic diagram of an example architecture in accordance with present principles.

Now referring to FIG. 2, a base software module, referred to herein as an Application Logic Coordination Unit (ALCU) 34, provides the mechanism to route application action and system events among software-implemented feature PIMs 36 and synchronizes behaviors between feature PIMs 36, which may be provided in different PIM combinations to provide different TV system product ranges and vended as different product packages and/or which may be individually downloaded from the Internet to the TV system 10 after home installation to, e.g., upgrade an existing module in the package or add a new module to the package to add a new feature to the TV system in exchange for, e.g., payment for the new feature.

As shown in FIG. 2, each PIM contains a feature-definition and execution code sub-module 38 which is unique to the particular PIM. Also, each PIM 36 contains a common code module 40 that is the same for all PIMs, for reasons to be shortly disclosed. Each PIM 36 also includes an ALCU interface 42 that communicates with an interface 44 of the ALCU 34, with the interfaces 42, 44 defining a common interface scheme to facilitate adding and removing PIMs 36 from the ALCU 34 with ease.

Each PIM 36, in addition to providing software to establish a respective feature for the TV system 10, can add callbacks into the ALCU 34 to define module product specific behaviors as needed, as more fully described below. Accordingly, the ALCU 34, which may be implemented in one embodiment as a singleton C++ class, is a routing mechanism to distribute system and action events between the PIMs. Each PIM 36 can add an event onto an ALCU 34 event queue through an ALCU, 34 interface as set forth further below.

In addition to routing information between PIMs 36, the ALCU 34 also keeps track of current active applications, as well as parent child relationships in a stack of list data structure, in which the list data structures represent relationship of sibling applications.

Actions and events are defined as requests to perform and action or the delivery of some information regarding an event. An example action is the request to launch an application by one PIM 36, and an example event is a keyboard key event being routed to an application associated with another PIM that was launched.

Figure 3:
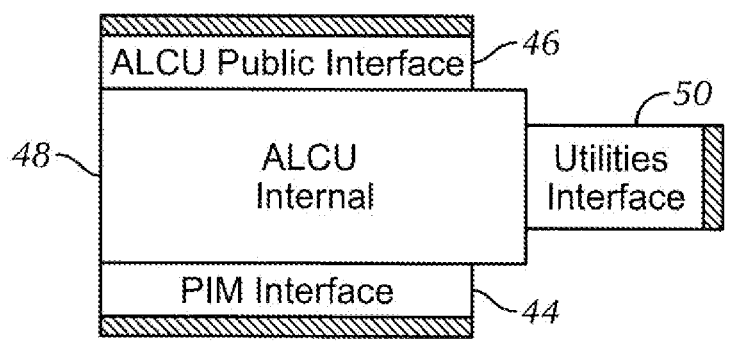
FIG. 3 is a diagram showing ALCU interfaces.

In addition to the interface 44 needed for the PIMs, as shown in FIG. 3 the example ALCU 34 has a public API 46 for controlling PIM installation and removal. In addition, the ALCU 34 includes an internal API 48 for the ALCU 34 utilities that provide common routines to service the routing operations.

The ALCU 34 base architecture thus provides a common means to connect the PIMs, an interface to control the PIM connections, and a common utility interface 50 that can be used by both the ALCU 34 and the PIMs. Each PIM can issue an action that is routed through the ALCU 34 to another PIM. The ALCU 34 receives events from a PIM and adds it to the event queue. Each item on the event queue is processed serially and dispatched to a target PIM. Rather than process a message for every function call in the system, the message passing advantageously may be done on a per-PIM basis to keep the overhead of the routing system low. Broadcast events to many PIMs call be handled by having each PIM register a callback handler to receive each type of event in which it is interested.

An ALCU 34 event queue is the core data structure for ALCU 34 to process all system events. The event queue can be implemented as simple as a FIFO queue providing First-Come First-Serve, or as a Priority Queue, in which events of highest priority get processed first to meet a time deadline. The complexity of the routing mechanism can be tailored to the product offering.

The ALCU 34 event format may be specified through a bit packed unsigned integer. The integer may include a module ID, an event type, a subevent type, and one or more event flags. The module ID indicates the source PIM of the event, while the event type specifies what is being sent. The subevent type and event flags allow parameters and qualifiers to be added to the event.

While the overall events are defined system wide, the combination of event and subevent gives ALCU 34 the flexibilities to tailor the routing granularity according to requests. To receive events, each PIM registers event handlers for events and sub-events it would like to receive. The ALCU 34 then routes events to those registered event handlers, or further to those registered sub-event handlers to avoid unnecessary broad casting or multi-casting messages.

Each PIM is derived from a base PIM interface, which may be a C++ abstract class that has a number of pure virtual methods that are implemented by the derived class. Each PIM can support installation, removal, initialization, and shut down of itself. Each PIM has entry points for receiving an application launch, system event, or key event.

A PIM, depending on its function, may not process all event types. For example, a PIM that provides the feature of receiving a key input from the remote control might issue a warning or error if it received an application launch request.

The ALCU 34 public interface 46 may be a "C" interface for system modules to access the ALCU 34 internals. The public interface provides for overall control of the ALCU 34 event queue, installing and removing PIMs and for instantiating ALCU 34, obtaining system state status and obtaining application parent, child and sibling relations.

The ALCU 34 utility interface 50 interfaces with utilities that can be used by both the ALCU 34 and the PIMs. These utilities are helper functions that return the active application ID, query the system state or add/remove the callbacks needed to specify the PIM behavior. The ALCU 34 utilities interface 50 also provides an ALCU 34 base unit an abstraction layer to access the system platform so that the details of the system platform may be abstracted from the ALCU 34 base unit part, which is a mechanism of event routing.

Figure 4:
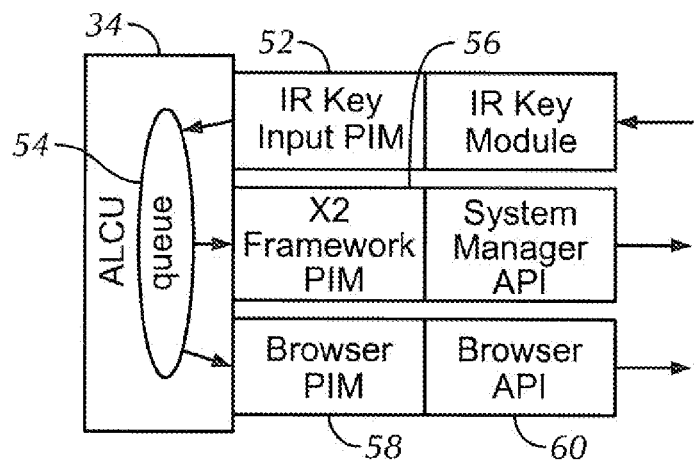
FIG. 4 is a diagram showing ALCU routing keys to PIMs.

As an example of how the above architecture functions, refer to FIG. 4 and suppose a "key event" is generated by a user manipulating a key on the remote control 24. The key event is detected by the TV processor and passed into the ALCU 34 through a PIM 52 whose sole function might be to alert the ALCU of command receipt ("key events"). The key event is added onto an event queue 54 in the ALCU 34. The event queue 54 may be in first come first order. Events in the queue are removed and routed to the other PIMs 56 that have registered a callback for key events. Focus handling may be arbitrated through the structure of the architecture.

For instance, in addition to a key event PIM, a PIM may include a product-specific browser PIM part 58 that defines the interactions of that PIM with other PIMs for the particular model line it is being used in, and a browser functionality part 60 that is common across all model lines to provide Web browser functionality. Such a PIM might register to receive "key events" from the key event PIM in some product lines but not in others, depending on the design of the particular product line and the mix of features it is intended to provide.

In the case where another PIM such as a browser PIM 58 registers to receive "key events" triggered by the remote control 24, the key event may be filtered through the ALCU 34 utilities, which can determine which application in which framework currently has focus on the TV. This allows a PIM to see the key input and further allows for hot-key support, isolating the system behavior within the PIM modules. The ALCU 34 keeps track of active applications as well as parent to child relationships between applications. A parent application may have multiple child applications.

It may now be appreciated that while a single browser PIM advantageously may be provided for multiple TV model lines, the browser module may be tailored to a desired higher or lower capability for a particular model line because each PIM can be programmed to define its system behavior, model line by model line, by registering an event handler for some events in one in model line and for other or fewer events in another model line. Once PIMs receive events routed from the ALCU 34, events are further translated in the PIM to the associated module operation/function calls.

To further promote easily adding or removing a feature PIM within a single code base for different products, the above architecture renders the PIMs "pluggable" using the interfaces and functionalities described above. For example, a browser PIM can be replaced without impacting the overall system architecture. To this end, the web browser PIM has a public interface which defines the PIM's public functions which can be called from the browser PIM. Each time the ALCU 34 calls the browser PIM, the browser PIM translates the call and then invokes the PIM's public functions. In this way, the browser PIM can be added, removed and replaced with different browser PIMs without affecting the system architecture.

Figure 5:
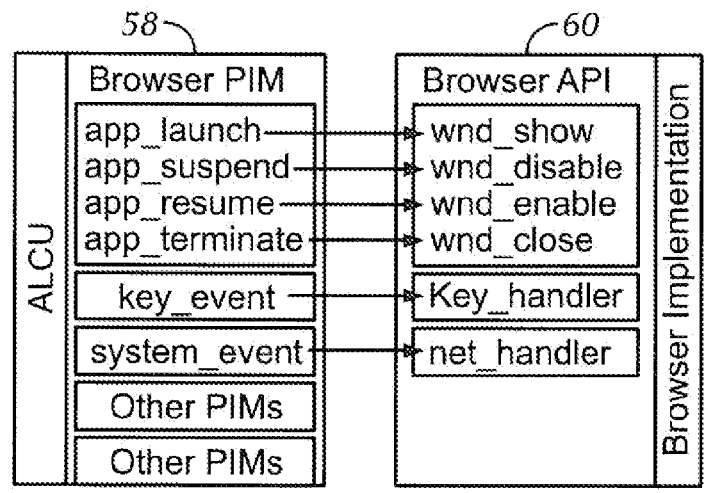
FIG. 5 is a diagram showing the PIM abstracts the browser API to be generic.

FIG. 5 shows that the product-specific browser PIM 58 translates the application action events, including application launch event, application resume event, application suspend event, and application terminate event as may be indicated by a particular "key event", to the calls expected by the browser API 60 that is associated with the browser PIM 58 and that, recall, is common to all model lines. For instances when the browser PIM 58 receives an application launch event specific to the model line, it invokes a public function of the browser API 60 to show the selected browser window. When the browser PIM 58 receives a key event indicating an application terminate event, it makes a call to the browser API 60 to close the window. The browser PIM 58 also attends to key format transformation as well, as indicated in FIG. 5.

Thus, the browser PIM 58 transforms the raw key inputs which are received from the ALCU 34 to the key format required by the browser. The browser PIM 58 also translates the network events to a specific browser event. Using a different browser means creating a new PIM that handles the translations needed for the new browser's call set. Together, both the browser PIM 58 and browser API 60 shown in FIG. 5 may be regarded as a single PIM that provides the functionality of the particular browser for which the API 60 is configured.

Figure 6:
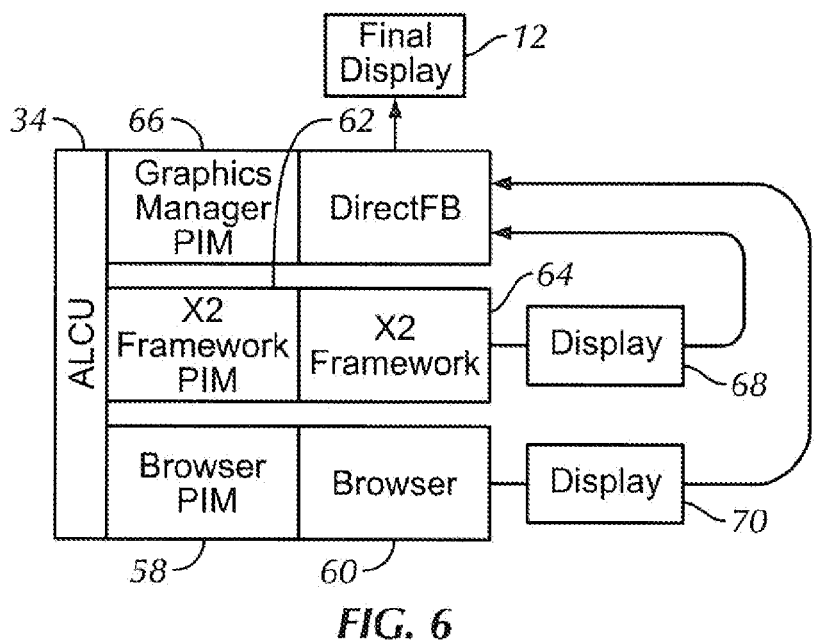
FIG. 6 is a diagram showing independent graphics rendering.

A modular graphics PIM 62 may also be provided, denoted "X2" in FIG. 6. IT essence, both the browser 60 and a graphics renderer 64 associated with the graphics PIM 62 are graphics rendering agents, and each can render graphics for presentation on the display 12 independently of the other, as indicated in FIG. 6. A graphics manager PIM 66 may be provided to coordinate compositing the respective outputs 68, 70 of the graphics renderer 64 and browser API 60 into final screen display. The graphics renderer 64 may be a 2D or 3D renderer and may support OpenGL.

It may now be appreciated that with the present plug-in architecture, with each PIM potentally being expediently tailored for different model lines as disclosed above essentially by being able to define interactions at the PIM level including application-to-application launch judgment to be product-specific, system integration time is significantly reduced compared to existing systems. A number of individual PIMs can be built into a new system in a short time period. By enhancing the software reusability, the stability of final software is incremented; the required manpower for software maintenance is reduced as well. Because the PIMs can be downloaded from the Internet, TVs incorporating present principles can add new features over time.

In addition to the PIMs mention above, by way of non-limiting example PIMs may also be provided for the follow features: Internet Search, Internet Video, Location-based services, Maps, Telephony, Communication, Community Photo service up/download (e.g., Flickr), Payments, Information overlay (e.g., My Page), Sync-to-broadcast overlay, computer Games, Diagnostics, EPG, DVR. Home networking PIMs may also be provided including photo/music/video sharing PIMs, DLNA PIM, a "push" PIM to push data from a phone to the TV via, e.g., Bluetooth, etc.

3D GUI PIMs may also be provided including cross-media bar PIM, Favorites PIM, device integration PIM.

Recall that each PIM registers for certain calls depending on the model line, so that when an application launch is received, the PIM calls a method to make an application launch judgment. If the value returned is false, the PIM does not launch its associated application. Further, an application in a modal line may block other applications from launching until the user makes a selection, while in other model lines the application may not block other applications.

Because each PIM can be tailored for its particular model line by programming the PIM to register for appropriate calls for that model line and by programming that PIM to make application launch judgments that are desired for a particular line, the same PIM can be used in multiple model lines with a different respective behavior for each line.

For example, a high end model line may desire to provide the features of a user interface that is native to that product, networking, and a browser user interface, in which case PIMs representing the native UI, one or more networking PIMs representing features such as HD World, digital video recorder, digital living network alliance (DLNA), etc. may be plugged into the ALCU.

On the other hand, a next-lower model line may be designed to provide networking and A WEB Browser UI (E.G., A local page for setup), in which case PIMs providing DLNA, EPG, and home security features may be plugged into the ALCU. A next-lower model may be designed to provide a native UI and networking, and PIM providing DVR, Bluetooth telephony, and remote control capability may be plugged into the ALCU. A next-lower model may be designed to provide a native UI without networking support in which case a BluRay DVD PIM and a Bluetooth telephony PIM may be plugged into the ALCU. A lowest end model may be designed to provide TV connection only without any extended UI, in which case a wireless A/V connection PIM and remote control PIM only may be provided, etc.

While the particular MODULAR FLEXIBLE SOFTWARE Example non-limiting architecture described further below FOR TV is herein shown and described in detail, it is to be understood that the subject matter which is encompassed by the present invention is limited only by the claims.

What is claimed is:

1. Display system, comprising:
    a processor circuitry implementing a TV feature architecture embodied in software and including:
    an application logic coordination unit (ALCU)
    and plural plug in modules (PIM) communicating with the ALCU, each PIM representing a desired TV system feature, the ALCU routing information between the PIMs, wherein new PIMs may be added to the ALCU to cooperate with PIMs communicating with the ALCU
    wherein a PIM providing a first feature embodies a first application launch judgment in a first model line and a PIM providing the first feature embodies a second application launch judgment in a second model line, the second application launch judgment being different than the first application launch judgment.

2. The system of claim 1, wherein a PIM providing a first feature registers for a first event in a first model line and a PIM providing the first feature registers for a second event in a second model line, the second event being different than the first event.

3. The system of claim 1, wherein PIM-to-PIM interactions are defined at the PIM level to be product-specific.

4. The system of claim 1, wherein each PIM includes:
    an interface code unique to a particular model line; and
    a feature code common across all model lines in which the PIM is sought to be used.

5. The system of claim 4, wherein the interface code translates calls from other PIMs received through the ALCU into calls understood by the feature code.

6. The system of claim 1, wherein the ALCU includes a public interface, a utilities interface, and a PIM interface.

7. A method comprising:
    providing in first and second TV system model lines an application logic coordination unit (ALCU) common to both model lines; and
    providing plural plug in modules (PIM) configured for communicating with the ALCU, with each PIM representing a desired TV system feature and with the ALCU routing information between the PIMs, wherein a set of PIMs in the first model line are different from a set of PIMs in the second model line;
    wherein a PIM providing a first feature embodies a first application launch judgment in a first model line and a PIM providing the first feature embodies a second application launch judgment in a second model line, the second application launch judgment being different than the first application launch judgment.

8. The method of claim 7, comprising downloading a new PIM to a TV in the first model line after the TV is vended to provide a feature represented by the PIM to the TV, the TV not having the feature prior to downloading the PIM.

9. The method of claim 7, wherein a PIM providing a first feature registers for a first event in a first model line and a PIM providing the first feature registers for a second event in a second model line, the second event being different than the first event.

10. The method of claim 7, wherein PIM-to-PIM interactions are defined at the PIM level to be product-specific.

11. The method of claim 7, wherein each PIM includes:
an interface code unique to a particular model line; and
a feature code common across all model lines in which the PIM is sought to be used, wherein the interface code is unique to a desired feature of the model line.

12. The method of claim 11, wherein the interface code translates calls from other PIMs received through the ALCU into calls understood by the feature code.

13. The method of claim 7, wherein the ALCU includes a public interface, a utilities interface, and a PIM interface.

14. TV system architecture embodied on a tangible computer readable storage medium comprising:
an application logic coordination unit (ALCU); and
plural plug in modules (PIM) communicating with the ALCU, each PIM representing a desired TV system feature, PIM-to-PIM interactions being defined at the PIM level to be product-specific.

15. The system of claim 14, wherein a PIM providing a first feature registers for a first event in a first model line and a PIM providing the first feature registers for a second event in a second model line, the second event being different than the first event.

16. The system of claim 14, wherein each PIM includes:
an interface code unique to a particular model line; and
a feature code common across all model lines in which the PIM is sought to be used, wherein the interface code translates calls from other PIMs received through the ALCU into calls understood by the feature code.

17. The system of claim 14, wherein the ALCU includes a public interface, a utilities interface, and a PIM interface.

* * * * *